Patented May 10, 1932

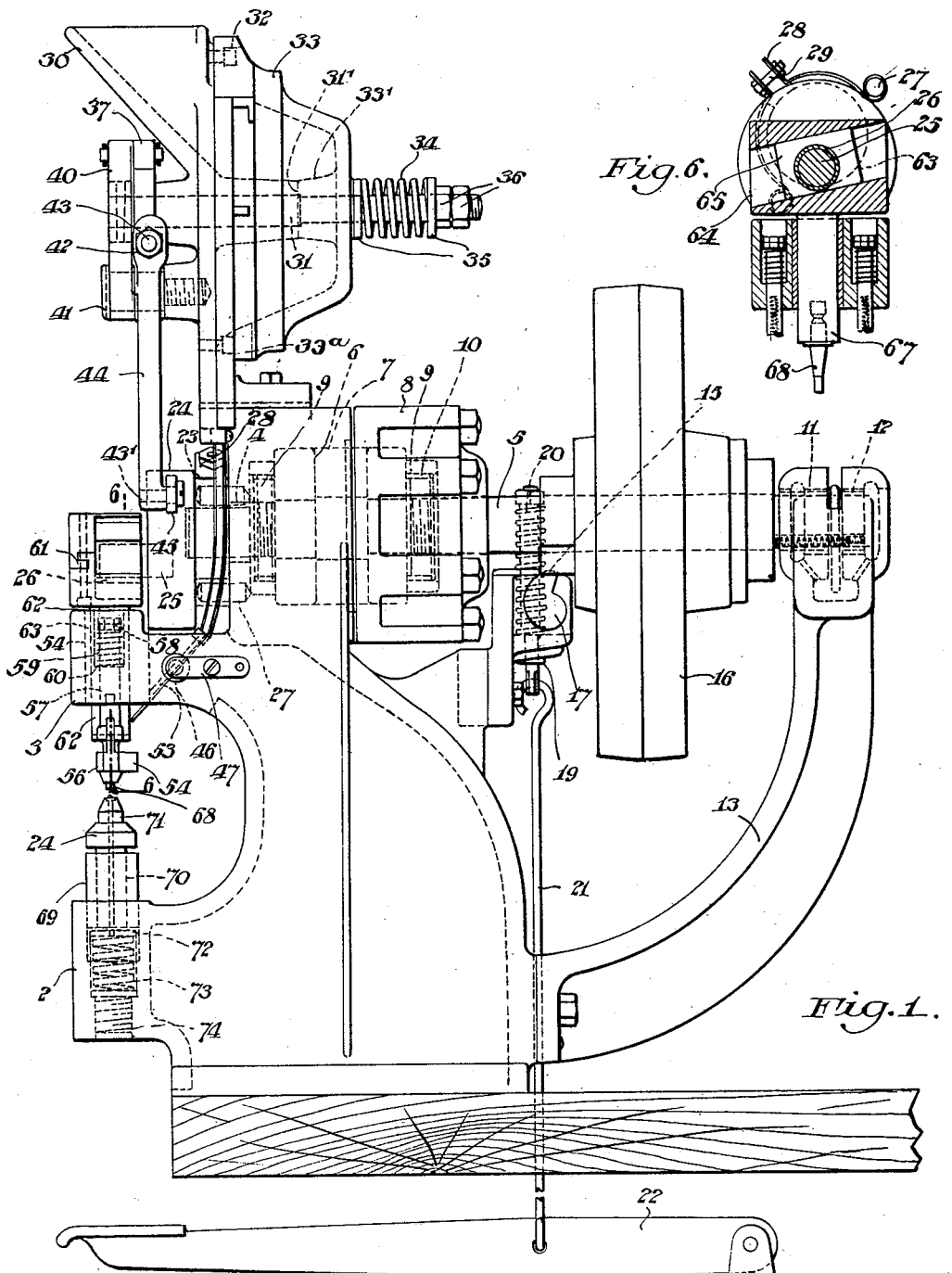

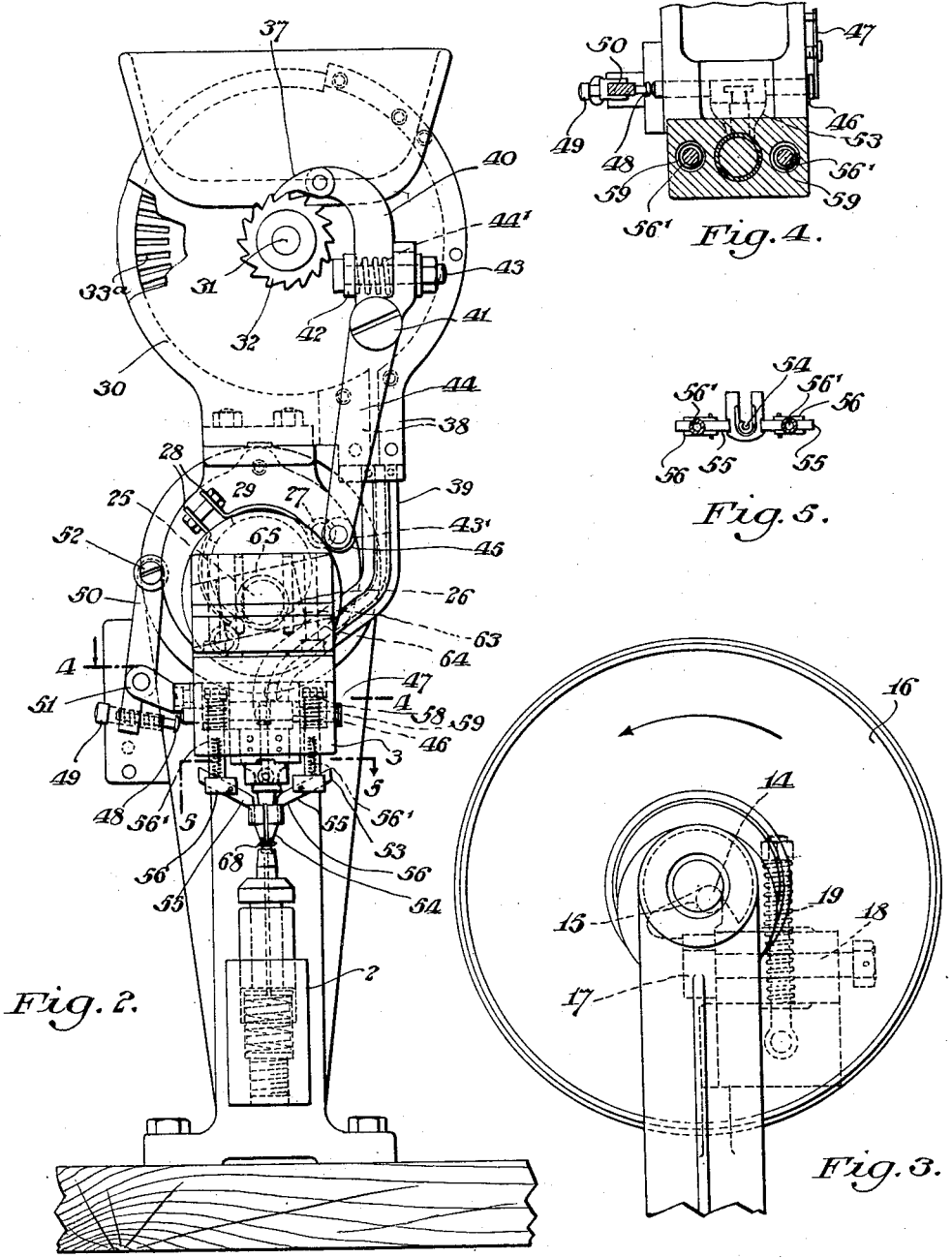

1,858,001

UNITED STATES PATENT OFFICE

CHALON E. CORSON AND WILLIAM A. WRIGHT, OF BRIDGEPORT, CONNECTICUT, ASSIGNORS TO THE MILFORD RIVET AND MACHINE COMPANY, OF MILFORD, CONNECTICUT, A CORPORATION OF CONNECTICUT

AUTOMATIC RIVETER

Application filed December 15, 1925. Serial No. 75,508.

Our invention is an improved machine, preferably of the power driven type, for feeding, positioning and upsetting rivets. Leading objects of our improvements are to provide means for readily connecting and disconnecting the power so as to cause the striking of blows individually or continuously; to transmit the power to the work with a minimum of shock to and vibration of the machine parts; to simplify the conversion of rotary movement of the driving shaft to reciprocatory movement of the driver mechanism and eliminate necessity for knuckles, pitman rods or the like; to cause the driving mechanism when at rest to hold a rivet in projected position to form a guide for positioning the work; to insure feeding of the rivets from the hopper; to permit yielding of the feeding and upsetting devices under abnormal conditions to avoid breakage of the machine; and generally to simplify, strengthen and increase the efficiency of machines of this type.

In the preferred embodiment of our invention, the main driving shaft is mounted in spaced bearings and has a pulley or driving wheel loosely journalled thereon between the bearings. The pulley and shaft are connected through an automatic key clutch normally rendered inoperative by a manually controlled detent. An adjustable brake tends to check the free rotation of the shaft, which has connected therewith a cam for operating rivet feeding mechanisms and a crank arm for operating the rivet driving mechanism which when brought to rest has projected a rivet shank through the rivet holding jaws and backs up the rivet head so as to prevent displacement of the rivet.

A slotted shell is revoluble by the cam through elastically connected lever and pawl mechanisms to feed rivets from a hopper to a slideway controlled by a slide or shuttle also operable by the cam through a lever and spring mounted plunger. The rivets are translated by the shuttle to a further slideway from which they drop between elastically mounted jaws.

A driver, having a shank reciprocable in a frame bearing, is operable from the crank arm, preferably through a block sliding in an inclined groove in the driver head, to eject a rivet, which is upset between a plunger on the driver and an elastically supported anvil.

The characteristic features and advantages of our improvements will more fully appear from the following description and the accompanying drawings in illustration of the preferred embodiment thereof.

In the drawings, Fig. 1 is a side elevation of a machine embodying our improvements; Fig. 2 is a front elevation thereof; Fig. 3 is a fragmentary rear elevation thereof; Fig. 4 is a fragmentary sectional view on the line 4—4 of Fig. 2; Fig. 5 is a fragmentary sectional view on the line 5—5 of Fig. 2; Fig. 6 is a fragmentary sectional view on the line 6—6 of Fig. 1.

As illustrated in the drawings, the main frame casting 1 has an anvil seat 2, an arm 3 overhanging the anvil seat, and a bronze bushed bearing 4 for the main driving shaft 5 which is revoluble in anti-friction bearings 6 positioned in the frame recess 7 by a housing 8. The shaft 5 is positioned axially by means of washers 9 screwed thereon against the bearing 6 and secured by a lock nut 10, and the outer end of the shaft has thereon a collar 11 journalled in a bronze bushed bearing 12 of a bracket 13 projecting from and bolted to the main frame casting 1.

The shaft 5 has cut longitudinally therein the curved keyway 14 in which is seated a half round key 15 pressed outwardly (radially) by an adjustable spring 15' to clutch to the shaft a belt pulley 16 journalled loosely on the shaft. A detent 17, fixed on a journalled toothed pin 18, is movable into and out of the path of the key 15 by the reciprocation of the rack 19 which engages the teeth of the pin 18, the rack being automatically elevated by a spring 20 to effect disengagement of the pulley from the shaft and manually depressible by a link 21 and lever 22 to permit the engagement of the pulley and shaft.

The end of the shaft 5 projecting through the bearing 4 has keyed thereto the hub 23 of a cam disk 24 having a periphery eccentric to the axis of the shaft 5. A stub shaft or boss 25 is fixed in a socket in the disk 24 and projects therefrom eccentrically to the axis of the shaft 5 to provide a bearing for the roller 26, the disk and boss forming a species of crank arm on the lever. Studs 27, on the frame 1, have pivotally connected therewith the spring steel brake bands 28 pressing against the hub 23 and adjustable by the bolt and nut 29.

A rivet hopper 30, bolted to the top of the frame 1, has journalled therein a shouldered shaft 31 to one end of which is pinned a ratchet wheel 32. A hopper shell 33 is sleeved on the reduced portion of the shaft 31 and has its hub 33′ pressed into frictional engagement with the shoulder 31′ of the shaft 31 by a coiled spring 34 positioned by the retainers 35 and nuts 36. The flanged edge of the shell 33 adjacent the hopper 30 contains the slots 33a for engaging and positively carrying rivets in the hopper to the rivet guides 38 forming a slot leading to the rivet slideway 39.

The shaft 31 is operated, to rotate the slotted shell 33 step by step and feed the rivets, by a pawl 37 pivotally connected with the lever 40 journalled on the stud 41 and having an apertured projection 42. A bolt 43, having coiled thereon a spring 44′, passes through the apertured projection 42 and elastically connects it with the apertured end of a lever 44 journalled on the stud 41. The lower arm of the lever 44 has a stud 43′ screwed therein on which is journalled a roller 45 making contact with the periphery of the eccentric disk 24.

The rivet slideway 39 is curved inward toward the vertical longitudinal axis of the machine to discharge rivets carried thereby to a reciprocable shuttle 46 containing a slot normally held out of registration with the mouth of the slideway 39 by the thrust of a leaf spring 47 mounted on the frame. The shuttle is movable into position to receive a rivet in its slot and against the action of the spring 47 by a spring pressed plunger 48 mounted in an adjustable set screw 49 in the lever 50 fulcrumed in the bracket 51 and having journalled thereon a roller 52 engaged and rocked by the cam nose on the periphery of the eccentric disk 24.

Rivets delivered by the slideway 39 to the shuttle are translated thereby and delivered between the shuttle block plates 53, where their shanks drop down to feeding position. The rivets drop from the plates 53 between the jaws 54 fixed to the arms 55 pivotally connected with the slotted posts 56 which contain recesses for the coiled springs 56′ which press against the tails of the arms 55 and tend to press the jaws 54 toward one another.

The posts 56 slide in the ways 57 in the arm 3 and have fixed to the upper ends thereof the adjustable nuts 58 which rest upon the springs 59 coiled about the rods and bearing on the bases of the counterbores 60.

A driver 61, formed of dovetailed sections bolted together and having a depending shank or stem 62 reciprocable in the bushed bearing 63 of the arm 3, has a diagonal slot or recess 64 formed in its rear surface to provide a slideway for a block 65 journalled upon the roller 26, and the bottom of the shank contains a socket 67 in which is fixed a punch or hammer 68.

A bushing 69, projecting from the seat 2, has seated therein a longitudinally slotted tool holder 70 containing a recess for the reception of a tool or anvil 71. The post of the tool holder rests upon a washer 72 supported by a stiff spring 73 positioned by an adjusting screw 74.

From the foregoing, it will be understood that the pulley 16 is normally driven from a source of power idly on the shaft 5 since the key 15 is rendered inoperative to clutch the pulley to the shaft by its engagement with the detent 17. When, however, the detent is rocked out of the path of the clutch key, by the operation of the lever 22, the clutch engages the pulley 16 to the shaft 5, which continues to operate until the detent 17 is again permitted to engage the clutch key 15. As soon as the power is disengaged from the shaft 5, the machine is brought to a prompt stop by the action of the brake springs 23. The key 15 is so positioned on the shaft that the power is thrown off and the mechanism brought to a stop after the member 68 has forced the shank of a rivet through the jaws 54 but before the head of the rivet has been pushed through the jaws. Consequently the projecting shank of the rivet provides a guide for positioning the work and which cannot be pushed up between the jaws by accidental contact with the work.

The rotation of the shaft 5 causes the cam disk 24 to rock the shaft 44 which, through the intermediate mechanism described, acts through the pawl 37 to advance the ratchet 32 and shaft 31 one step to bring a slot in the shell 33 into registration with the slot between the guide plates 38. A rivet carried in a slot 33a of the shell 33 thereupon drops down through the slide ways formed by the parts 38 and 39.

The free flow of rivets through the slide ways is prevented by the shuttle 46 which is normally pressed by the spring 47 to the left as shown in Fig. 2 so as to present a blank surface to the end of the slide way. The rotation of the shaft 5, however, causes the nose of the cam disk 24 to rock the lever 50 which acts through the elastically mounted member 48 to thrust the shuttle against the resistance of the spring 47 to the right so that the slot in the shuttle registers with the slot in the slide way and one rivet from the slide way drops into the slot in the shuttle. If, however, the shuttle for any reason becomes jammed, the plunger 48 yields so as to avoid breaking the machine. When the high point of the disk 24 has passed the roller 52 on the lever 50, the spring 47 again pushes the shuttle to the left to bring its slot into registration with the slot between the plates 53, through which the shank of the rivet drops and the rivet is deposited in upright position between the jaws 54, through which it is pushed by the plunger 68.

The continued or subsequent rotation of the shaft 5 acts through the crank arm formed by the stud 25, roller 26, slide 65 and slideway 64 to further depress the driver so as to cause the punch 68 to drive the rivet completely out of the jaws, through the work and against the anvil 71.

Having described our invention, we claim:

1. A riveter comprising a driver, a rivet slideway, jaws to which rivets are delivered from said slideway, arms connected with said jaws, elastically mounted posts supporting said jaws, and a punch operable by said driver for driving a rivet from said jaws.

2. A riveter comprising a plurality of elastically mounted posts, arms carried by said posts, jaws connected with said arms, and a driver having a member adapted for driving a rivet through said jaws.

3. An automatic riveter comprising an anvil, elastically mounted jaws above said anvil, means for delivering a rivet to said jaws, driving mechanism for forcing a rivet through said jaws, and means for automatically stopping said driving mechanism against the head of a rivet having its shank protruding through said jaws.

In testimony whereof we have hereunto set our names this 8th day of December, 1925.

CHALON E. CORSON.
WILLIAM A. WRIGHT.